United States Patent
Olochwoszcz et al.

(10) Patent No.: US 9,947,332 B2
(45) Date of Patent: Apr. 17, 2018

(54) METHOD AND APPARATUS FOR AUTOMATIC AUDIO ALIGNMENT IN A HYBRID RADIO SYSTEM

(71) Applicant: iBiquity Digital Corporation, Columbia, MD (US)

(72) Inventors: Gabriel Olochwoszcz, Hillsborough, NJ (US); Ashwini Pahuja, Roslyn Heights, NY (US)

(73) Assignee: Ibiquity Digital Corporation, Columbia, MD (US)

( * ) Notice: Subject to any disclaimer, the term of this patent is extended or adjusted under 35 U.S.C. 154(b) by 209 days.

(21) Appl. No.: 14/966,716

(22) Filed: Dec. 11, 2015

(65) Prior Publication Data

US 2017/0169832 A1   Jun. 15, 2017

(51) Int. Cl.
*H04B 1/16* (2006.01)
*G10L 19/16* (2013.01)
*G10L 19/008* (2013.01)
*G10L 19/24* (2013.01)

(52) U.S. Cl.
CPC .......... *G10L 19/167* (2013.01); *G10L 19/008* (2013.01); *G10L 19/24* (2013.01); *H04B 1/16* (2013.01)

(58) Field of Classification Search
CPC ....... G10L 19/008; G10L 19/16; G10L 19/24; G10L 19/167; H04B 1/16; H04B 1/18; H04H 60/29; H04H 60/35; H04H 60/58; H04L 25/03; H04W 4/06
USPC ................ 370/312, 516; 375/316, 340, 346; 455/2.01, 3.02, 160.1
See application file for complete search history.

(56) References Cited

U.S. PATENT DOCUMENTS

| | | |
|---|---|---|
| 6,178,317 B1 | 1/2001 | Kroeger et al. |
| 6,473,604 B1 | 10/2002 | Hinkle et al. |
| 6,590,944 B1 | 7/2003 | Kroeger |
| 6,735,257 B2 | 5/2004 | Kroeger |
| 6,901,242 B2 | 5/2005 | Kroeger et al. |
| 7,039,204 B2 | 5/2006 | Baumgarte |

(Continued)

OTHER PUBLICATIONS

"International Application Serial No. PCT/US2016/065754, International Search Report dated Mar. 10, 2017", 4 pgs.

(Continued)

*Primary Examiner* — Shawkat M Ali
(74) *Attorney, Agent, or Firm* — Schwegman Lundberg & Woessner, P.A.

(57) ABSTRACT

A method of processing a digital radio broadcast signal includes: (a) determining a plurality of current correlation sample values representative of a time delay between samples in an analog audio sample stream and samples in a digital audio sample stream; (b) determining a current inversion status; (c) updating a delay history and an inversion status history; (d) checking the current correlation sample values for consistency with a first confidence threshold; (e) if consistency is found in step (d), determining if each of a first plurality of values in the delay history is consistent within a predetermined range of the current correlation sample values; (f) if consistency is found in step (e), determining if a value in the inversion status history is consistent with the current inversion status; and (g) if the consistency is found in step (f), allowing blending of an output to the digital audio sample stream.

20 Claims, 3 Drawing Sheets

(56) References Cited

U.S. PATENT DOCUMENTS

| | | | |
|---|---|---|---|
| 7,546,088 B2 | 6/2009 | Kroeger et al. | |
| 7,715,566 B2 | 5/2010 | Seo | |
| 7,944,998 B2 | 5/2011 | Shridhar et al. | |
| 7,953,183 B2 | 5/2011 | Shridhar et al. | |
| 8,027,419 B2 | 9/2011 | Iannuzzelli et al. | |
| 8,040,989 B2 | 10/2011 | Nekhamkin et al. | |
| 8,165,548 B2 | 4/2012 | Kon et al. | |
| 8,180,470 B2 | 5/2012 | Pahuja | |
| 8,290,423 B2* | 10/2012 | Wang | H04H 60/27 455/2.01 |
| 8,520,852 B2 | 8/2013 | Shah et al. | |
| 8,576,949 B2 | 11/2013 | Shah et al. | |
| 8,615,095 B2 | 12/2013 | Chen | |
| 8,804,865 B2 | 8/2014 | Elenes et al. | |
| 8,976,969 B2 | 3/2015 | Elenes et al. | |
| 9,025,773 B2 | 5/2015 | Whitecar et al. | |
| 9,300,413 B2 | 3/2016 | Jaisimha et al. | |
| 9,407,383 B2 | 8/2016 | Milbar et al. | |
| 9,413,322 B2 | 8/2016 | Soulodre et al. | |
| 9,559,657 B2 | 1/2017 | Jaisimha et al. | |
| 9,584,347 B2* | 2/2017 | Elenes | H04L 25/03834 |
| 9,755,598 B2 | 9/2017 | Olochwoszcz | |
| 2006/0019601 A1 | 1/2006 | Kroeger et al. | |
| 2006/0227814 A1 | 10/2006 | Iannuzzelli et al. | |
| 2007/0291876 A1 | 12/2007 | Shridhar et al. | |
| 2007/0293167 A1 | 12/2007 | Shridhar et al. | |
| 2011/0110464 A1 | 5/2011 | Watanabe | |
| 2012/0028567 A1* | 2/2012 | Marko | H04W 4/206 455/3.02 |
| 2013/0003637 A1 | 1/2013 | Elenes et al. | |
| 2013/0003894 A1 | 1/2013 | Elenes et al. | |
| 2013/0003904 A1 | 1/2013 | Elenes et al. | |
| 2013/0343547 A1 | 12/2013 | Pahuja et al. | |
| 2014/0140537 A1 | 5/2014 | Soulodre | |
| 2016/0241350 A1 | 8/2016 | Nekhamkin et al. | |
| 2017/0179899 A1 | 6/2017 | Olochwoszcz et al. | |

OTHER PUBLICATIONS

"International Application Serial No. PCT/US2016/065754, Written Opinion dated Mar. 10, 2017", 10 pgs.
"In-Band/On-Channel Digital Radio Broadcasting Standard", NRSC-5-C, National Radio Systems Committee, Washington, DC, Sep. 2011.
"Algorithms to measure audio programme loudness and true-peak audio level", Recommendation ITU-R BS. 1770-3 (2012), 1-22.
"U.S. Appl. No. 14/974,809, Non Final Office Action dated Feb. 7, 2017", 10 pgs.
"U.S. Appl. No. 14/974,809, Notice of Allowance dated May 3, 2017", 8 pgs.
"U.S. Appl. No. 14/974,809, Response filed Apr. 19, 2017 to Non Final Office Action dated Feb. 7, 2017", 7 pgs.
Soulodre, Gilbert A, et al., "Development and Evaluation of Short-Term Loudness Meters", Audio Engineering Society Convention Paper 6889, Presented at the 121st Convention, San Francisco, California, (Oct. 5-8, 2006), 1-10.
Soulodre, Gilbert A, "Evaluation of Objective Loudness Meters", Audio Engineering Society Convention Paper 6161, Presented at the 116th Conventio, Berlin, Germany,, (May 8-11, 2004), 1-12.

* cited by examiner

METHOD AND APPARATUS FOR AUTOMATIC AUDIO ALIGNMENT IN A HYBRID RADIO SYSTEM

FIELD OF THE DISCLOSURE

The present disclosure relates to digital radio broadcast receivers and, in particular, to methods and systems for processing of analog and digital pathways in digital radio receivers.

BACKGROUND INFORMATION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC technology can provide digital quality audio, superior to existing analog broadcasting formats. Because each IBOC signal is transmitted within the spectral mask of an existing AM or FM channel allocation, it requires no new spectral allocations. IBOC promotes economy of spectrum while enabling broadcasters to supply digital quality audio to the present base of listeners.

The National Radio Systems Committee, a standard-setting organization sponsored by the National Association of Broadcasters and the Consumer Electronics Association, adopted an IBOC standard, designated NRSC-5A, in September 2005. NRSC-5, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio technology is an implementation of the NRSC-5 IBOC standard. Further information regarding HD Radio technology can be found at www.hdradio.com and www.ibiquity.com.

Other types of digital radio broadcasting systems include satellite systems such as Satellite Digital Audio Radio Service (SDARS, e.g., XMRadio™, Sirius®), Digital Audio Radio Service (DARS, e.g., WorldSpace®), and terrestrial systems such as Digital Radio Mondiale (DRM), Eureka 147 (branded as DAB Digital Audio Broadcasting®), DAB Version 2, and FMeXtra®. As used herein, the phrase "digital radio broadcasting" encompasses digital audio and data broadcasting including in-band on-channel broadcasting, as well as other digital terrestrial broadcasting and satellite broadcasting.

Both AM and FM In-Band On-Channel (IBOC) broadcasting systems utilize a composite signal including an analog modulated carrier and a plurality of digitally modulated subcarriers. Program content (e.g., audio) can be redundantly transmitted on the analog modulated carrier and the digitally modulated subcarriers. The analog audio is delayed at the transmitter by a diversity delay.

In the absence of the digital audio signal (for example, when the channel is initially tuned) the analog AM or FM backup audio signal is fed to the audio output. When the digital audio signal becomes available, a blend function smoothly attenuates and eventually replaces the analog backup signal with the digital audio signal while blending in the digital audio signal such that the transition preserves some continuity of the audio program. Similar blending occurs during channel outages which corrupt the digital signal. In this case, the analog signal is gradually blended into the output audio signal by attenuating the digital signal such that the audio is fully blended to analog when the digital corruption appears at the audio output. Corruption of the digital audio signal can be detected during the diversity delay time through cyclic redundancy check (CRC) error detection means, or other digital detection means in the audio decoder or receiver.

The concept of blending between the digital audio signal of an IBOC system and the analog audio signal has been previously described in, for example, U.S. Pat. Nos. 7,546,088; 6,178,317; 6,590,944; 6,735,257; 6,901,242; and 8,180,470, the disclosures of which are hereby incorporated by reference. The diversity delay and blend allow the receiver to fill in the digital audio gaps with analog audio when digital outages occur. The diversity delay ensures that the audio output has a reasonable quality when brief outages occur in a mobile environment (for example, when a mobile receiver passes under a bridge). This is because the time diversity causes the outages to affect different segments of the audio program for the digital and analog signals.

In the receiver, the analog and digital pathways may be separately, and thus asynchronously, processed. In a software implementation, for example, analog and digital demodulation processes may be treated as separate tasks using different software threads. Subsequent blending of the analog and digital signals requires that the signals be aligned in time before they are blended.

SUMMARY

According to an exemplary embodiment, a method of processing a digital radio broadcast signal in a digital radio receiver includes: (a) determining a plurality of current correlation sample values representative of a time delay between samples in an analog audio sample stream and samples in a digital audio sample stream; (b) determining a current inversion status between the samples in an analog audio sample stream and samples in a digital audio sample stream; (c) updating a delay history and an inversion status history; (d) checking the current correlation sample values for consistency with a first confidence threshold; (e) if consistency is found in step (d), determining if each of a first plurality of values in the delay history is consistent within a predetermined range of the current correlation sample values; (f) if consistency is found in step (e), determining if a value in the inversion status history is consistent with the current inversion status; and (g) if the consistency is found in step (f), allowing blending of an output to the digital audio sample stream.

In another embodiment, a receiver for a digital radio broadcast signal includes a processing circuit configured to: (a) determine a plurality of current correlation sample values representative of a time delay between samples in an analog audio sample stream and samples in a digital audio sample stream; (b) determine a current inversion status between the samples in an analog audio sample stream and samples in a digital audio sample stream; (c) update a delay history and an inversion status history; (d) check the current correlation sample values for consistency with a first confidence threshold; (e) if consistency is found in step (d), determine if each of a first plurality of values in the delay history is consistent within a predetermined range of the current correlation sample values; (f) if consistency is found in step (e), determine if a value in the inversion status history is consistent with the current inversion status; and (g) if the consistency is found in step (f), allow blending of an output to the digital audio sample stream.

In another embodiment, an article of manufacture includes a computer readable storage medium containing executable instructions adapted to cause a processing system to execute the above-described method of processing a digital radio broadcast signal.

DETAILED DESCRIPTION

Embodiments described herein relate to the processing of the digital and analog components of a digital radio broadcast signal to control a blend function. While aspects of the disclosure are presented in the context of an exemplary IBOC system, it should be understood that the present disclosure is not limited to IBOC systems and that the teachings herein are applicable to other forms of digital radio broadcasting as well.

Figure 1:
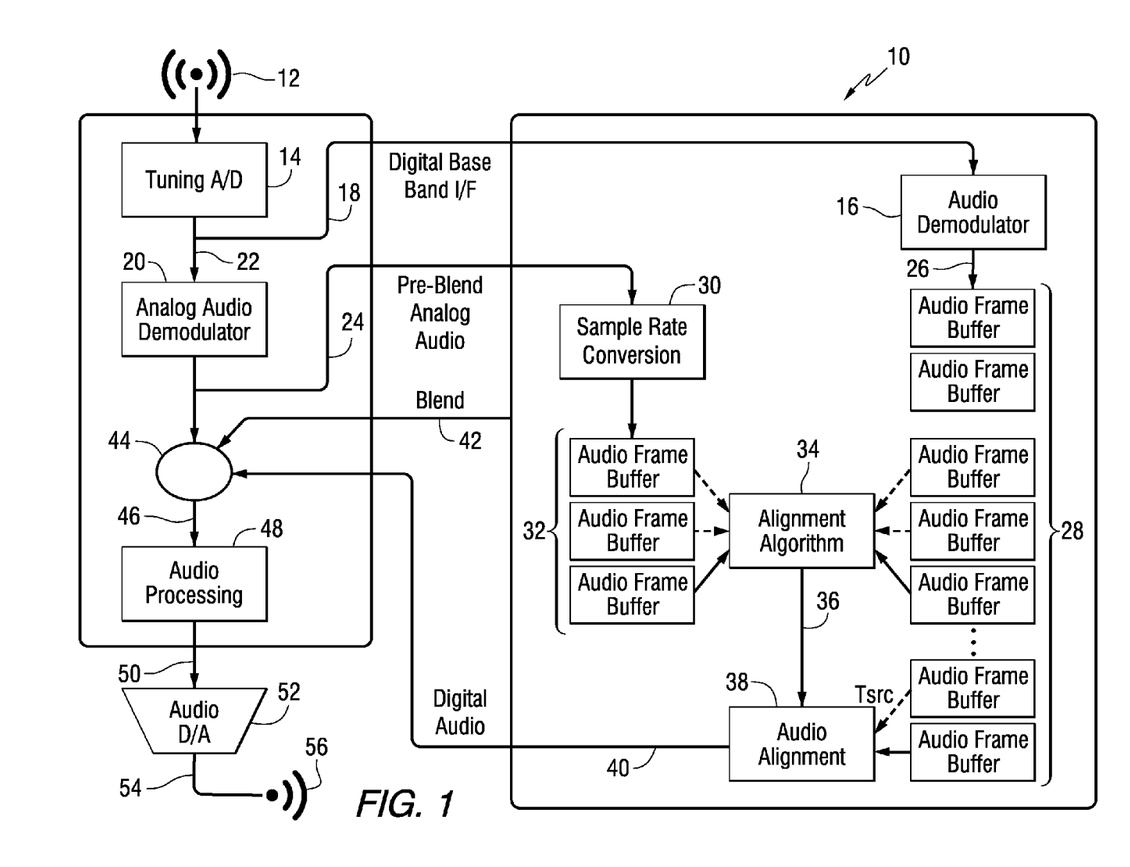
FIG. 1 is a functional block diagram of the audio alignment architecture of an IBOC radio receiver.

Referring to the drawings, FIG. 1 is a functional block diagram of the audio alignment architecture of an IBOC radio receiver 10. The IBOC signal is received on an antenna 12, and processed in a front end circuit 14 that includes a tuner and analog to digital converter to produce an intermediate frequency signal that is passed to a digital audio demodulator 16 on line 18, and to an analog audio demodulator 20 on line 22. The analog audio demodulator produces a stream of audio samples on line 24. Since this stream of audio samples is derived from the analog modulated portion of the received IBOC radio signal, it is referred to in this description as the analog audio stream (or analog audio portion). The digital audio demodulator produces a stream of audio samples on line 26. Since this stream of audio samples is derived from the digitally modulated portion of the received IBOC radio signal, it is referred to in this description as the digital audio stream (or digital audio portion). The samples of the digital audio stream are stored in a plurality of digital audio buffers 28. The samples of the analog audio stream are subject to sample rate conversion in block 30 and stored in a plurality of analog audio buffers 32. An alignment process is performed on the samples in the analog and digital audio buffers in block 34. The alignment process produces an offset value on line 36 that is used to adjust the alignment of the digital audio samples to produce an aligned digital audio signal on line 40. The base band processor also produces a blend signal on line 42 that controls the blend function performed in item 44. Only the digital audio stream is modified to achieve alignment because the analog signal can be on a different processor. Further, making adjustments to a delay on the currently playing audio stream can lead to distortion/artifacts which will not be desirable for the user.

The blend function receives the analog audio samples and the digital audio samples, and produces an output on line 46. The output of the blend function is subject to audio processing in block 48 to produce an audio output on line 50 that is converted to an analog signal in a digital to analog converter 52 to produce a signal on line 54 that is sent to an output device, such as a speaker 56.

A basic unit of transmission of the digital radio broadcast signal in AM and FM 1130C transmission systems is the modem frame, which is typically on the order of a second in duration. A fixed number of audio frames can be assigned to each modem frame. The audio frame period is the length of time required to render, e.g., play back audio for a user, the samples in an audio frame. For example, if an audio frame contains 2048 samples, and the sampling period is 22.67 μsec, then the audio frame period would be approximately 46.44 milliseconds. A scheduler determines the total number of bits allocated to the audio frames within each modem frame.

Figure 2A:
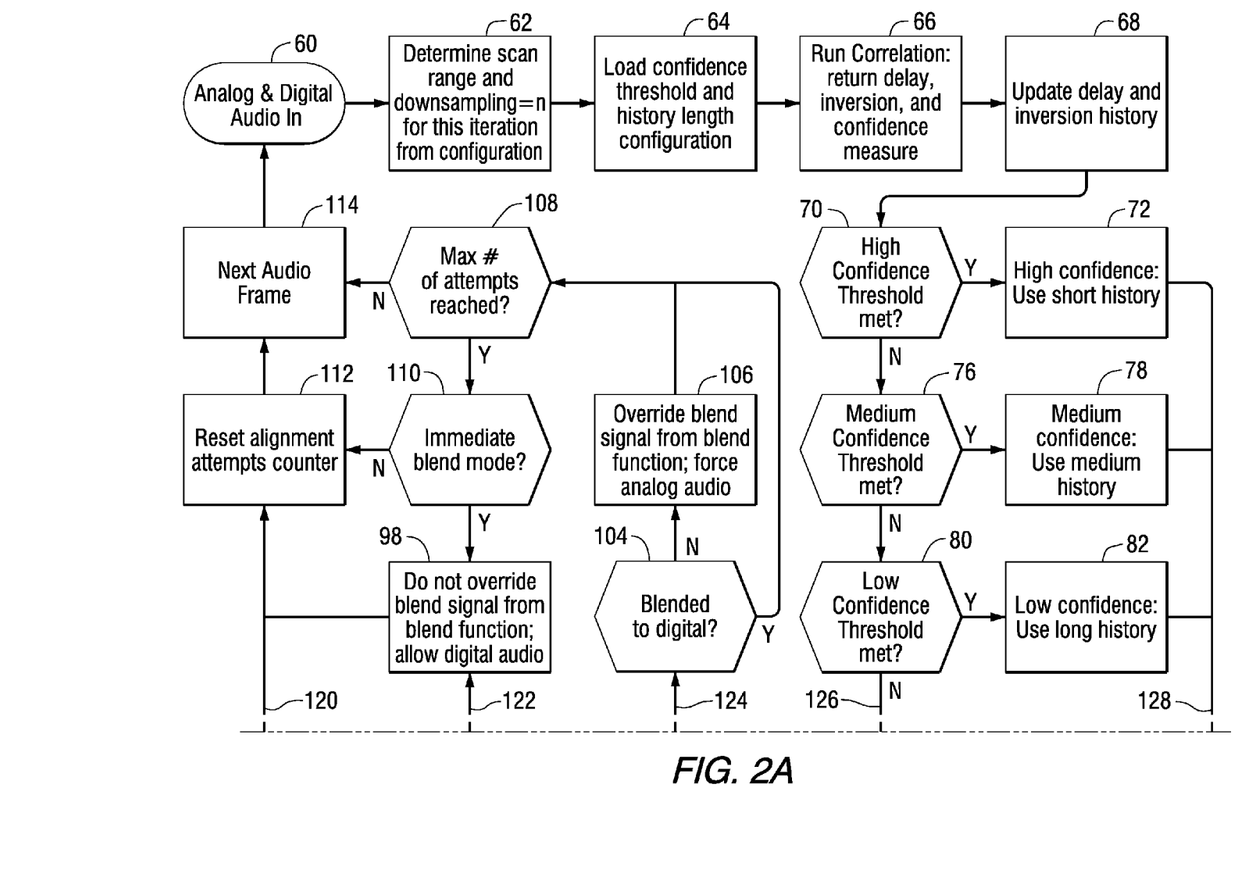
FIGS. 2A and 2B show a functional block diagram of an audio alignment method.
Figure 2B:
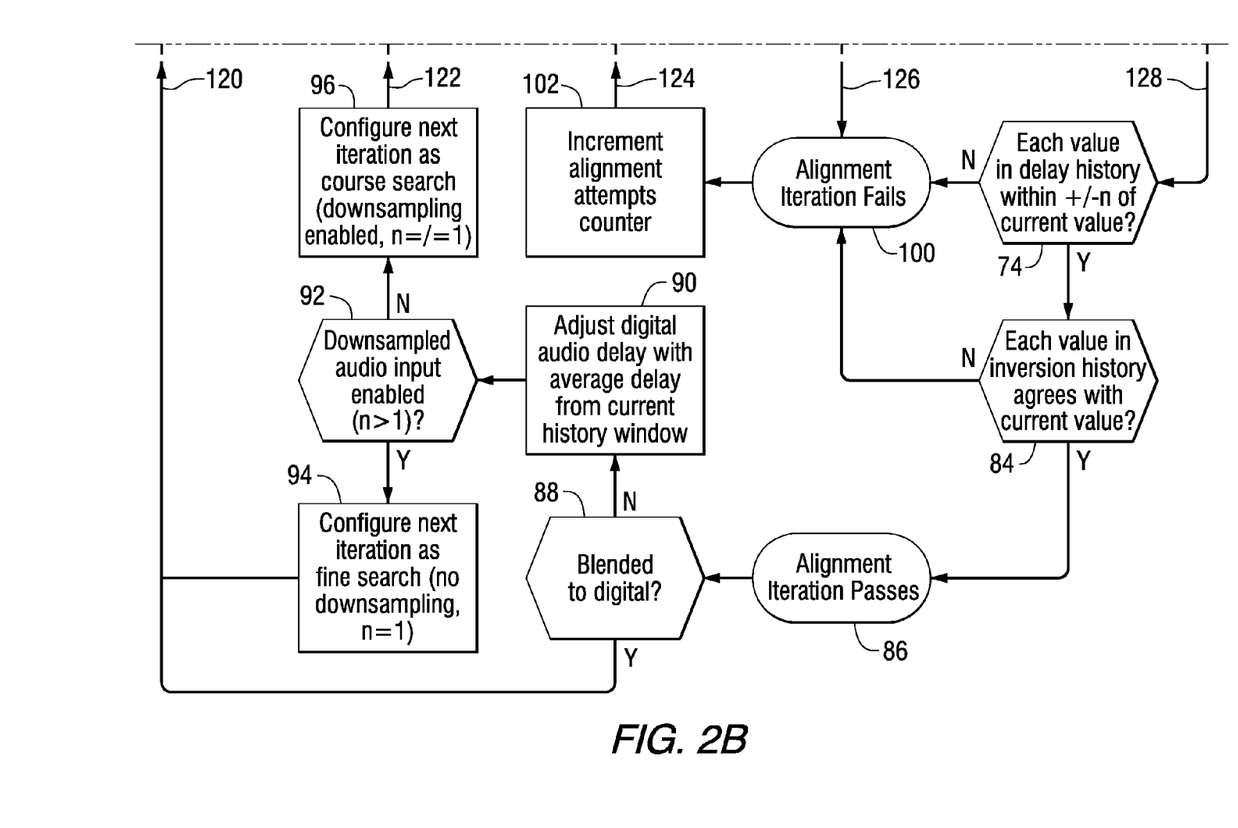

FIGS. 2A and 2B show a functional block diagram of an audio alignment method that can be performed in the receiver of FIG. 1. FIGS. 2A and 2B illustrate an iterative process in which a delay is measured between analog audio samples and digital audio samples and the measured delay is compared with one or more historical delays (e.g., from previous measurements) to determine if a predetermined confidence level is met. The results of this confidence test are used to determine if sufficient alignment exists to enable blending of an analog audio output to a digital audio output.

In block 60, a stream of digital audio samples and a stream of analog audio samples are presented for processing. These samples can be arranged in a plurality of audio frames. The digital and analog audio streams can represent the same program content.

In block 62, configuration parameters are consulted to determine a scan range (i.e., and number of samples to used for a subsequent correlation operation) and to determine a downsampling factor n. The downsampling factor (coarse alignment) is selected to provide shorter processing time for larger scan ranges while maintaining a level of accuracy acceptable for blending if fine alignment is not found on subsequent iterations. Smaller scan ranges allow for very quick processing, but limit the ability for larger delays to be detected. Larger scan ranges take longer to buffer before processing can begin, but have the potential to find a large delay on a single pass.

In block 64, confidence thresholds and history length parameters are loaded. As used in this description, a confidence threshold is a minimum confidence value (that can be provided by a correlation library) required for a delay result to be considered valid. In various embodiments, a confidence value can be an integer representing the strength of the correlation result from the correlation library.

The history length is a configurable parameter for the number of previous values to be compared with the current value, tied to each of the confidence thresholds. Higher confidence requires fewer previous values to match the current values; lower confidence requires more previous values to match the current values. The value here has two parts: the calculated delay returned by the correlation library and the phase inversion indicator. Each of these is saved following a successful correlation pass (i.e., confidence>threshold) and compared to the current delay and inversion (comparing the delay first). The minimum confidence value is the same as the confidence threshold, i.e., an integer value set in configuration that the confidence from the correlation library must exceed in order for a result to be considered valid.

The confidence thresholds can include, for example, a high threshold, a medium threshold, and a low threshold. These thresholds may be referred to as first, second, and third thresholds, respectively. The history lengths can include a short history, a medium history, and a long history. These history lengths may be referred to as first, second, and third history lengths, respectively. The history length specifies a number of samples to be used for subsequent confidence tests. The samples here are prior correlation results for alignment delay and phase inversion. The audio streams are not saved in any way from frame to frame.

A correlation operation is performed in block 66 to determine the relative delay between the digital audio samples and the analog audio samples. The correlation operation also provides an indication of an inversion between the digital audio samples and the analog audio samples, and a confidence measure. Inversion occurs when the audio waveform is flipped upside down around 0, i.e., multiplied by −1. For example, in a phase inverted sine wave, the peak normally at 1 would occur at −1 and the peak normally at −1 would occur at 1. In an ideal example, if two otherwise identical and time aligned but phase inverted audio sources are mixed together, the sum of every sample at the output would be 0 and the audio would be silence. In practice, the audio level dips noticeably while blending due to the cancellation caused by mixing the two phase inverted streams and then recovers once the mixing is complete and only one stream is being output. The correlation library sends a signal that the phase is inverted. If inversion is found, the alignment process flags the need for correction to the audio processing layer and the output of the digital audio is multiplied by −1 when it is copied from an alignment delay buffer to the output delay buffer. The confidence measure is the value returned by the correlation library that is compared with the confidence threshold. Confidence measure values lower than a base threshold will not pass the consistency process and will force another iteration. The threshold in this example is always an integer, which can range from 0 to 127.

The medium and high confidence thresholds can take the form of a low (or base) threshold plus a constant. The confidence thresholds are implemented such that the high confidence threshold constant is greater than the medium threshold constant, and the medium threshold constant is greater than zero. The history lengths (window sizes) are implemented such that the high confidence window size is less than the medium confidence window size, and the medium confidence window size is less than the low confidence window size.

The delay and inversion status history are updated as shown in block 68. The inversion history can be stored as a binary 0/1 value (representing not inverted or inverted). The history is used to compare the detected inversion of the current iteration with previous iterations. Inconsistent inversion history is used to rule out a correlation peak calculated on similar, but not identical, portions of the signals being compared. This is a common false positive in correlation and frequently manifests in a similar calculated delay as the actual delay, but with a negative peak.

The history update is accomplished by copying the values from the most recent iteration into a buffer for each of the delay and inversion containing the values from previous iterations (up to the maximum configurable history length to allow for dynamic configuration changes) and removing the oldest value from the same buffers. The delay and inversion are results from the correlation. The short, medium, and long term history lengths are measures of the number of previous iterations to be compared with the current iteration for each of delay and inversion. The overall history length represents a time history divided into discrete windows defined by the length of the scan range. The total time history for a passing result is the length of the scan range multiplied by the number of consecutive iterations required to find consistent results.

The confidence measure returned by the correlation library in block 66 is compared to the high confidence threshold as shown in block 70. If the measure is greater than the high confidence threshold, the delay returned by the current iteration is compared to the short history number of items from the delay history as shown in block 72. The items are the delay offset and phase inversion results from previous iterations of the correlation. The delay history is checked for consistency over the number of previous correlation results specified by the short history length configuration, as shown in block 74. A history consistency check is defined as passing when there are consecutive matches equal to the length of the history window (number of previous correlation results), at a tolerance of ±n (where n is the downsampling factor). Any other outcome is a failure. For example, the values in the history must be within ±n of the current value, i.e. for n=5 (downsampling), current value=5, history values=10, 0 is a passing result. Similarly, for n=1 (no downsampling), current value=4, history values=3, 5 is a passing result.

The current value is included in the history length to be checked. This is because the history is updated prior to the check. For example, a history length of 3 is comparing the current value with the previous 2 values. Consistency is defined as delay history equal to ±n to the current value and a 100% match in inversion history to the current value.

If the comparison in block 70 does not meet the high confidence threshold, the confidence measure determined in block 66 is compared to a medium history confidence threshold as shown in block 76. If the confidence measure is greater than the medium history confidence threshold, the delay returned by the current iteration is compared to the medium history number of items, as shown in block 78. The items are the delay offset and phase inversion results from previous iterations of the correlation. If the comparison exceeds the medium confidence threshold, the delay history is checked for consistency over the number of previous correlation results specified by the medium history length configuration, as shown in block 74.

If the comparison in block 76 does not meet the medium confidence threshold, the confidence measure determined in block 66 is compared to a low history confidence threshold as shown in block 80. If the measure is greater than the low history confidence threshold, the delay returned by the current iteration is compared to the long history number of items for a low confidence result, as shown in block 82. If the comparison exceeds the medium confidence threshold, the delay history is checked for consistency over the number of previous correlation results specified by the long history length configuration, as shown in block 74.

Blocks 72, 78, and 82 indicate that the history size to be checked is tied to each confidence threshold. Block 74 is looking at the entirety of the history check, i.e., "Is each item in history ±n of the current iteration?"

Testing the confidence against high, medium and low thresholds provides the opportunity to achieve a faster result, if for example, the high confidence threshold is met, a decision can be made using a small number of correlation history samples, and thus taking a small amount of time.

If value in the delay history is consistent within ±n samples of the most recent value, then each value of the inversion history is checked for consistency with the current inversion value as shown in block 84. If consistency is found, then the time alignment passes as shown in block 86.

Once consistent delay and inversion values have been found between the analog audio and the digital audio streams and applied to the digital stream, then the output can be blended from analog to digital. If the system is already blended to digital as shown in block 88, the alignment attempts counter is reset. If the output is not blended to digital, then the digital audio delay is adjusted with the average delay (truncated to the nearest integer) from the current history window as shown in block 90.

Following the digital audio adjustment in block 90, block 92 shows a check to determine if a downsampled audio input is enabled. If so, the next iteration is configured as a fine search as shown in block 94. A fine search is a search with no downsampling, i.e., n=1.

If the downsampled audio input is not enabled, then the next iteration is configured as a coarse search as shown in block 96. A coarse search is a search with downsampling, i.e., n≠1. Then the alignment function stops overriding the blend signal provided by the blend function as shown in block 98. The blend status is the flag that allows the overall system to play digital audio. The blend status flag is the means by which the software triggers the blend signal. The blend signal and blend status flag can be considered the same for this description.

The blend status in FIG. 2B would override the blend signal provided by the blend function so that the system remains in the analog output state. The order is: the blend function sends blend to digital signal; the alignment function determines if alignment is found; and the alignment function overrides blend signal to remain in analog if necessary. Once alignment is found, the alignment function would not intervene and the blend function result would take priority. When the auto alignment process is enabled, it will override the blend signal passed from the blend function until alignment is found or the number of allowed attempts is exhausted (configurable). Other portions of the system may still prevent a blend to digital.

If the confidence threshold tests of blocks 70, 76 and 80, the delay history consistency test of block 74, or the inversion history test of block 84 are not met, then the alignment iteration fails as shown in block 100 and an alignment attempts counter is incremented as shown in block 102.

Then if the output has not been blended to digital as shown in block 104, the blend signal is overridden to force an analog audio output as shown in block 106. If the output has been blended to digital, the system checks if the maximum number of attempts has been reached in block 108. If so, the system checks to determine if it is in the immediate blend mode in block 110. The immediate blend mode is a configurable option that allows the receiver to blend after a predetermined, configurable number of iterations without alignment being found. Blend will occur faster in this situation if alignment is not found within that number of iterations but the audio will be misaligned.

If the system is not in an immediate blend mode, the alignment attempts counter is reset in block 112 and the system advances to the next audio frame in block 114 for the next iteration. The alignment attempts counter is also reset in response to the operation of block 98

FIGS. 2A and 2B illustrate an iterative process that can be run at least twice before an initial blend from analog to digital. Item numbers 120, 122, 124, 126 and 128 identify lines that are common to FIG. 2A and FIG. 2B.

Successive correlation operations can be implemented over a rolling time window that can be selected between predetermined time limits (i.e., a scan length or scan range) of, for example 46 milliseconds to 3 seconds. The correlation operation can provide a delay value and a confidence measure. The delay value and confidence measure can be calculated by a black box operation which implements a mathematical correlation operation. For example, any correlation function which provides a delay, a confidence measure, and inversion signal can be used.

The described process can continue in background while digital audio is playing. This allows delay and inversion history to be updated and saved based on the most recent good quality digital audio for future digital audio outages, not the audio initially used to determine alignment and blend. No updates to the inversion and/or the delay applied to the digital audio streams are allowed during the background process.

In an event of a digital audio outage, the delay and inversion history from previous attempts is retained and used for alignment checks when the digital audio becomes available. This allows the system to blend more quickly following outages by assuming that the alignment of the digital and analog audio has not changed and only requiring a full new history to be accumulated if something beyond the scope of the automatic alignment system has affected the digital versus analog alignment. Any changes in the detected delay or inversion values will only be applied to the digital audio stream during the next analog to digital blend following a digital audio outage, i.e., blend from digital to analog audio caused by digital audio outage, followed by a period of analog audio, and concluding with a blend from analog to digital audio using the newly determined values.

The functions illustrated in FIGS. 2A and 2B can be performed in the baseband processor, for example, which can comprise a processing system that may include one or more processing units (e.g., processors or other circuitry) configured (e.g., programmed with software and/or firmware) to perform the functionality described herein, wherein the processing system of the baseband processor can be suitably coupled to any suitable memory (e.g., RAM, Flash ROM, ROM).

The exemplary approaches described herein may be carried out using any suitable combinations of software, firmware and hardware and are not limited to any particular combinations of such. Computer program instructions for implementing the exemplary approaches described herein using any suitable processing system may be embodied on a computer-readable storage medium, the storage medium being a physical object, such as a magnetic disk or other magnetic memory, an optical disk (e.g., DVD) or other optical memory, RAM, ROM, or any other suitable memory such as Flash memory, memory cards, etc.

While the invention has been described in terms of several embodiments, it will be apparent to those skilled in the art that various changes can be made to the disclosed embodiments without departing from the scope of the invention as defined by the following claims. The embodiments described above and other embodiments are within the scope of the claims.

What is claimed is:

1. A method of processing a digital radio broadcast signal in a digital radio receiver, the method comprising:
   (a) determining a plurality of current correlation sample values representative of a time delay between samples in an analog audio sample stream and samples in a digital audio sample stream;
   (b) determining a current inversion status between the samples in an analog audio sample stream and samples in a digital audio sample stream;
   (c) updating a delay history and an inversion status history;
   (d) checking the current correlation sample values for consistency with a first confidence threshold;
   (e) determining if each of a first plurality of values in the delay history is consistent within a predetermined range of the current correlation sample values when the consistency is found in step (d);
   (f) when the consistency is found in step (e), determining if a value in the inversion status history is consistent with the current inversion status; and
   (g) when the consistency is found in step (f), allowing blending of an output to the digital audio sample stream.

2. The method of claim 1, wherein if the consistency is not found in step (d), then the method further comprises:
   (h) checking the current correlation sample values for consistency with a second confidence threshold;
   (i) if the consistency is found in step (h), determining if each of a second plurality of values in the delay history is consistent within a predetermined range of the current correlation sample values;
   (j) if the consistency is found in step (i), determining if the value in the inversion status history is consistent with the current inversion status; and
   (k) if the consistency is found in step (j), allowing blending of the output to the digital audio sample stream.

3. The method of claim 2, wherein if the consistency is not found in step (h), then the method further comprises:
   (I) checking the current. correlation sample values for consistency with a third confidence threshold;
   (m) if the consistency is found in step (l), determining if each of a third plurality of values in the delay history is consistent within a predetermined range of the current correlation sample values;
   (n) if the consistency is found in step (m), determining if the value in the inversion status history is consistent with the current inversion status; and
   (o) if the consistency is found in step (n), allowing blending of the output to the digital audio sample stream.

4. The method of claim 3, wherein if the consistency is not found in step (k), then the method further comprises:
   repeating steps (a), (b), (c), (d), (e), (f) and (g) using different samples in the analog audio sample stream and different samples in the digital audio sample stream.

5. The method of claim 3, wherein the first confidence threshold is lower than the second confidence threshold, and the second confidence threshold is lower than the third confidence threshold.

6. The method of claim 3, wherein the first plurality of values in the delay history is smaller than the second plurality of values in the delay history, and the second plurality of values in the delay history is smaller than the third plurality of values in the delay history.

7. The method of claim 1, wherein the history update is accomplished by copying values from a most recent correlation iteration into a buffer for each of the delay and inversion containing the values from previous iterations up to a maximum configurable history length.

8. The method of claim 7, wherein an overall history length represents a time history divided into discrete windows defined by a length of a scan range.

9. A receiver for a digital radio broadcast signal, the receiver comprising:
   an antenna and a processing circuit, the processing circuit configured to:
   (a) determine a plurality of current correlation sample values representative of a time delay between samples in an analog audio sample stream and samples in a digital audio sample stream;
   (b) determine a current inversion status between the samples in an analog audio sample stream and samples in a digital audio sample stream;
   (c) update a delay history and an inversion status history;
   (d) check the current correlation sample values for consistency with a first confidence threshold;
   (e) determine if each of a first plurality of values in the delay history is consistent within a predetermined range of the current correlation sample values when the consistency is found in step (d);
   (f) when the consistency is found in step (e), determine if a value in the inversion status history is consistent with the current inversion status; and
   (g) when the consistency is found in step (f), allow blending of an output to the digital audio sample stream.

10. The receiver of claim 9, wherein if the consistency is not found in step (d), then the processing circuit is further configured to:
    (h) check the current correlation sample values for consistency with a second confidence threshold;
    (i) if the consistency is found in step (h), determine if each of a second plurality of values in the delay history is consistent within a predetermined range of the current correlation sample values;
    (j) if the consistency is found in step (i), determine if the value in the inversion status history is consistent with the current inversion status; and
    (k) if the consistency is found in step (j), allow blending of the output to the digital audio sample stream.

11. The receiver of claim 10, wherein if the consistency is not found in step (h), then the processing circuit is further configured to:
    (l) check the current correlation sample values for consistency with a third confidence threshold;
    (m) if the consistency is found in step (l), determine if each of a third plurality of values in the delay history is consistent within a predetermined range of the current correlation sample values;
    (n) if the consistency is found in step (m), determine if the value in the inversion status history is consistent with the current inversion status; and (o) if the consistency is found in step (n), allow blending of the output to the digital audio sample stream.

12. The receiver of claim 11, wherein if the consistency is not found in step (k), then the processing circuit is further configured to:
repeat steps (a), (b), (c), (d), (e), (f) and (g) using different samples in the analog audio sample stream and different samples in the digital audio sample stream.

13. The receiver of claim 11, wherein the first confidence threshold is lower than the second confidence threshold, and the second confidence threshold is lower than the third confidence threshold.

14. The receiver of claim 11, wherein the first plurality of values in the delay history is smaller than the second plurality of values in the delay history, and the second plurality of values in the delay history is smaller than the third plurality of values in the delay history.

15. The receiver of claim 9, wherein the history update is accomplished by copying values from a most recent correlation iteration into a butler for each of the delay and inversion containing the values from previous iterations up to a maximum configurable history length.

16. The receiver of claim 15, wherein an overall history length represents a time history divided into discrete windows defined by a length of a scan range.

17. A non-transitory computer readable storage medium containing executable instructions configured to cause a processing system to execute a method comprising:
(a) determining a plurality of current correlation sample values representative of a time delay between samples in an analog audio sample stream and samples in a digital audio sample stream;
(b) determining a current inversion status between the samples in an analog audio sample stream and samples in a digital audio sample stream;
(c) updating a delay history and an inversion status history;
(d) checking the current correlation sample values for consistency with a first confidence threshold;
(e) determining if each of a first plurality of values in the delay history is consistent within a predetermined range of the current correlation sample values when the consistency is found in step (d);
(f) when the consistency found in step (e), determining if a value in the inversion status history is consistent with the current inversion status; and
(g) when the consistency is found in step (f), allowing blending of an output to the digital audio sample stream.

18. The non-transitory computer readable storage medium of claim 17, further containing executable instructions configured to cause a processing system to execute the steps of:
(h) checking the current correlation sample values for consistency with a second confidence threshold;
(i) if the consistency is found in step (h), determining if each of a second plurality of values in the delay history is consistent within a predetermined range of the current correlation sample values;
(j) if the consistency is found in step (i), determining if the value in the inversion status history is consistent with the current inversion status; and
(k) if the consistency is found in step (j), allowing blending of the output to the digital audio sample stream.

19. The non-transitory computer readable storage medium of claim 18, further containing executable instructions configured to cause a processing system to execute the steps of:
(l) checking the current correlation sample values for consistency with a third confidence threshold;
(m) if the consistency is found in step (l), determining if each of a third plurality of values in the delay history is consistent within a predetermined range of the current correlation sample values;
(n) if the consistency is found in step (m), determining if the value in the immersion status history is consistent with the current inversion status; and
(o) if the consistency is found in step (n), allowing blending of the output to the digital audio sample stream.

20. The non-transitory computer readable storage medium of claim 19, further containing executable instructions configured to cause a processing system repeat steps (a), (b), (c), (d), (e), (f) and (g) using different samples in the analog audio sample stream and different samples in the digital audio sample stream.

* * * * *

UNITED STATES PATENT AND TRADEMARK OFFICE
CERTIFICATE OF CORRECTION

PATENT NO. : 9,947,332 B2  
APPLICATION NO. : 14/966716  
DATED : April 17, 2018  
INVENTOR(S) : Olochwoszcz et al.

Page 1 of 1

It is certified that error appears in the above-identified patent and that said Letters Patent is hereby corrected as shown below:

On the Title Page

In item (73), in "Assignee", in Column 1, Line 1, delete "Ibiquity" and insert --iBiquity-- therefor In the Claims In Column 9, Line 23, in Claim 1, delete "threshold:" and insert --threshold;-- therefor In Column 9, Line 50, in Claim 3, delete "(I)" and insert --(l)-- therefor In Column 11, Line 20, in Claim 15, delete "butler" and insert --buffer-- therefor In Column 12, Line 1, in Claim 17, after "consistency", insert --is--

In Column 12, Line 32, in Claim 19, delete "immersion" and insert --inversion-- therefor Signed and Sealed this  
Twenty-eighth Day of May, 2019

Andrei Iancu  
*Director of the United States Patent and Trademark Office*